Oct. 9, 1956      G. G. LANDIS ET AL      2,766,361
CONTROL SYSTEM FOR ARC-WELDING APPARATUS
Filed March 13, 1953      3 Sheets-Sheet 1

INVENTORS,
GEORGE G. LANDIS
HAROLD S. PAYNE
BY Alfred C. Body

INVENTORS,
GEORGE G. LANDIS
HAROLD S. PAYNE

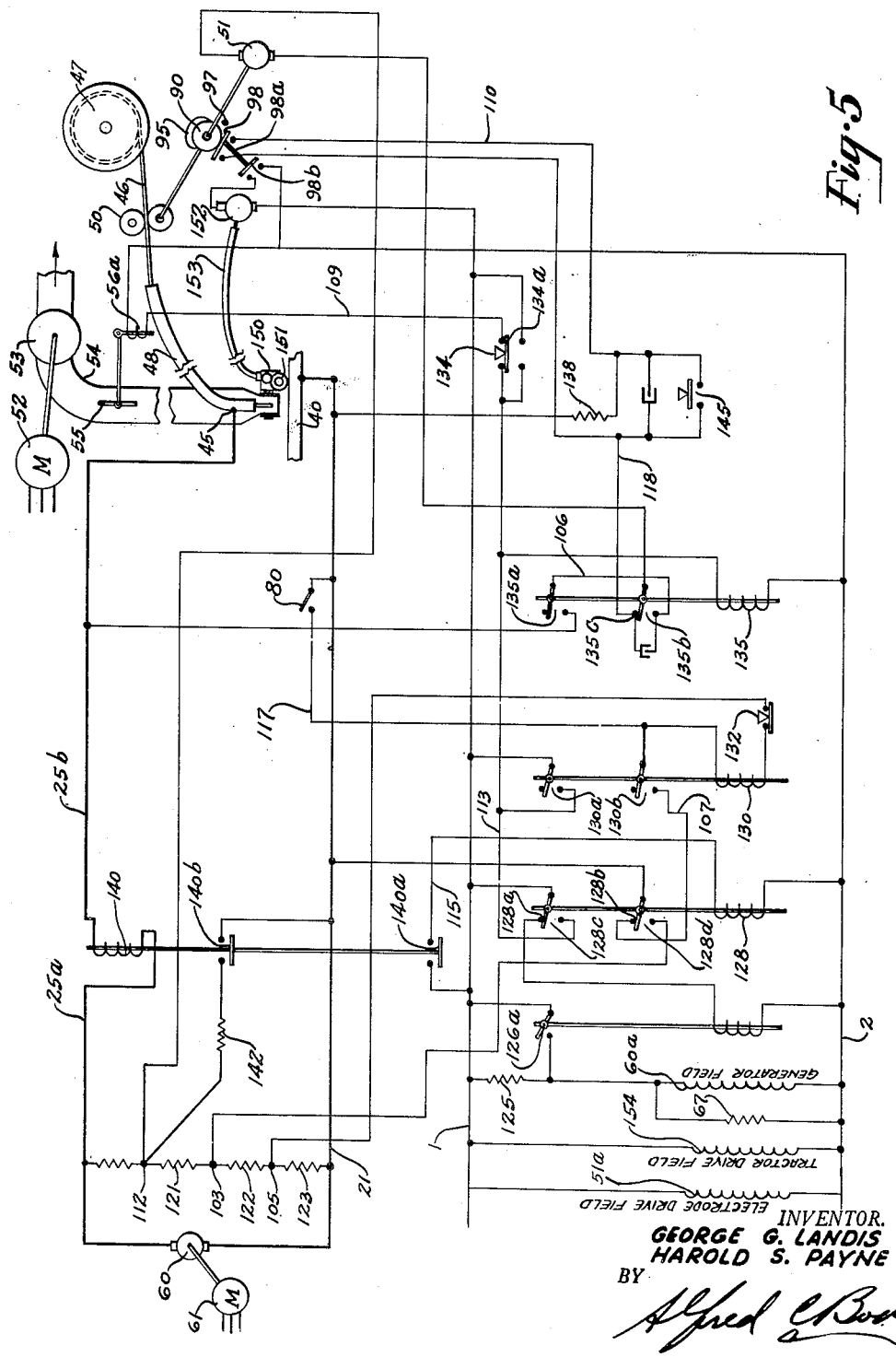

United States Patent Office 2,766,361
Patented Oct. 9, 1956

2,766,361

CONTROL SYSTEM FOR ARC-WELDING APPARATUS

George G. Landis, South Euclid, and Harold S. Payne, Cleveland Heights, Ohio, assignors to The Lincoln Electric Company, Cleveland, Ohio, a corporation of Ohio Application March 13, 1953, Serial No. 342,192

5 Claims. (Cl. 219—131)

This invention pertains to the art of arc welding and, more particularly, to control apparatus and a method of operating same for starting and stopping of the arc-welding operation.

The invention is particularly adapted to arc welding of the continuous type wherein a long flexible electrode is fed from a reel through a welding head toward the work and an arc is maintained beneath a pile of loose granular flux material, the welding head preferably being of the portable type and will be described with particular reference thereto, although it will be appreciated that the invention has broader applications.

With apparatus of the type referred to, in the past it has been necessary for the operator to manipulate a number of various controls, switches and the like in order to start the welding operation, to stop the welding operation or to ready it for the next welding operation or to de-energize the electrode relative to the workpiece when it is not desired to perform a welding operation. The operation of these various controls renders it necessary to properly train welding operators and causes the concentration on the operation of the controls to, in some ways, detract the operator's attention from the principal job at hand; namely, the effecting of a proper and perfect weld seam. Any error or improper manipulation of the controls can cause serious difficulty with the operation of the machine, electric shocks to the operator or unintentional arcing of the electrode to the workpiece or other surrounding metal connected to the welding electrode or the unintentional scattering and wasting of the welding flux.

Another problem with apparatus of this type has been the stopping of the welding arc without damaging the welding head or in the formation of undesirable elements on the end of the welding electrode which will interfere with the subsequent restarting of the arc. For example, in the past it has been proposed to reverse the electrode feed, to pull the wire away from the work and, thus, increase the space between the end of the electrode and the workpiece to a point beyond which the electric arc can be maintained. Also, it has been proposed to simply de-energize the electrode by means of a contactor in series with the welding circuit. In either event, there is a tendency for the molten flux which is around the end of the electrode to form a small hardened bead thereon which insulates the end of the electrode such that when it is again desired to start the welding operation, difficulty is experienced with striking of the arc as the electrode touches the workpiece.

The present invention contemplates welding apparatus of the continuous type wherein a continuous wire electrode, usually flux, is fed to a workpiece from a welding head including the controls therefor, and the method of operating same which eliminates all of the above referred to difficulties and provides a fully automatic operation for the starting, stopping and other necessary steps of the welding operations wherein the welding operator need merely touch the weld head to start the weld and remove it from the workpiece to stop the weld and ready the apparatus for the next welding operation and which also prevents the formation of any detrimental beads on the end of the welding electrode.

In accordance with the present invention, there is provided for use in conjunction with a welding head means for feeding an electrode through the welding head and usually means for discharging flux from the welding head onto the seam to be welded and means on the welding head which, when actuated, will start the flow of flux to the workpiece and, at a predetermined interval of time thereafter, automatically cause the electrode to engage the workpiece to initiate the welding arc.

Also, in accordance with the invention, there is provided for operation at the end of a weld, control apparatus for pulling the electrode end back into the weld head to reset the apparatus for the next welding operation. This pulling back may be through a restricted opening to wipe off any flux bead which might tend to form on the end of the electrode when the welding arc is extinguished. This pulling back of the electrode may be set into operation by any operation which interrupts the flow of welding current; such as, removing the welding head rapidly from the workpiece at a rate faster than the electrode is being fed toward the workpiece or by interrupting the flow of electrode current by means of contactors associated with the apparatus.

This pulling back of the electrode may be for a predetermined time or a predetermined distance such that the timing of the engagement of the electrode with the workpiece after the flux is allowed to be discharged upon the workpiece when a welding operation is to begin may be automatically controlled. In other words, when it is desired to start the next welding operation, the means for discharging flux onto the workpiece and the means for feeding the electrode to the workpiece may be started simultaneously; but, because of the distance which the electrode end must travel to reach the workpiece, a predetermined time interval elapses after the flux has begun to flow and before the electrode contacts the work to start the electric arc.

Alternatively, this delay may be controlled by timing means or a combination of both. Normally, some time delay must occur between the initial depositing of the flux along the weld seam and the engagement of the electrode with the workpiece so that, when the arc is initially struck, it will be below the flux and the initial weld will be protected from the outside atmosphere by the flux material which, as is well known, immediately melts in the presence of the heat of the arc to provide a protective blanket over the welded seam.

The invention also contemplates an electrode nozzle so constructed and arranged as to not only wipe off the flux bead which might form on the end of the electrode but to insure that the electric arc will be extinguished as the electrode is pulled away from the workpiece and to prevent at any time the formation of an electric arc from the workpiece to the end of the electrode nozzle which, in some cases, happened during the operation of apparatus constructed in accordance with the invention.

Thus, the present invention also contemplates an electrode nozzle having means on the workpiece end thereof through which the electrode passes for insuring that the arc will be extinguished by the time the end of the electrode has been pulled back into the electrode nozzle. Such means may comprise a cap of insulating material or, preferably, a cap of metallic material of high heat conductivity such as copper which is electrically insulated from the electrode nozzle.

Further in accordance with the invention, the welding head is formed with a flux-discharge opening defined by a metallic member insulated from the remainder of the welding apparatus but which is electrically energized through control means such that when touched to the workpiece, the welding apparatus may be automatically started into operation as above described. A pressure-sensitive switch or both could also be used.

The principal object of the invention is the provision of new and improved welding apparatus and the method of operating which overcomes all of the difficulties referred to above and which is simple and foolproof in operation and has a minimum number of component parts so as to be economical to build and maintain.

Another object of the invention is the provision of a new and improved control circuit for welding apparatus of the type described wherein it is only necessary to touch the welding head to the workpiece to start the welding operation and only necessary to withdraw the welding head from the workpiece in order to stop the welding operation. Stopping of the welding operation effects a pull back of the electrode so as to prepare the apparatus for the commencement of the subsequent welding operation.

Still another object of the invention is the provision of a new and improved electrode nozzle having means on the end thereof for snuffing out the electric arc upon the pull back of the electrode into the nozzle.

Still another object of the invention is the provision of a new and improved means and method for stopping an electric arc-welding operation which comprises withdrawing the electrode from the workpiece to extinguish the arc and into the electrode nozzle to wipe off any bead of flux which might otherwise tend to form on the end of the electrode.

Another object is the provision of automatic welding apparatus wherein the electrode may be continuously energized, thus eliminating high current-carrying contactors and, yet, there is no danger of arcing by accidental contact of the electrode with the workpiece.

Still another object of the invention is the provision of new and improved welding apparatus of the type described which only requires the touching of the welding head itself as distinguished from the welding electrode to the workpiece in order to start into operation the events necessary to commence the welding operation. Other objects will appear upon a reading and understanding of the preferred embodiment of the invention as will be described hereinafter.

The invention may be comprised in certain steps and combination of steps and certain parts and arrangement of parts, a preferred embodiment of which will be described in detail in this specification and illustrated in the accompanying drawing which is a part hereof, and wherein:

Figures 1a and 1b are fragmentary views of alternative embodiments of the invention for controlling the length of pull back of the electrode;

Figure 5 is a schematic circuit diagram of a modified embodiment of the invention.

Figure 1:
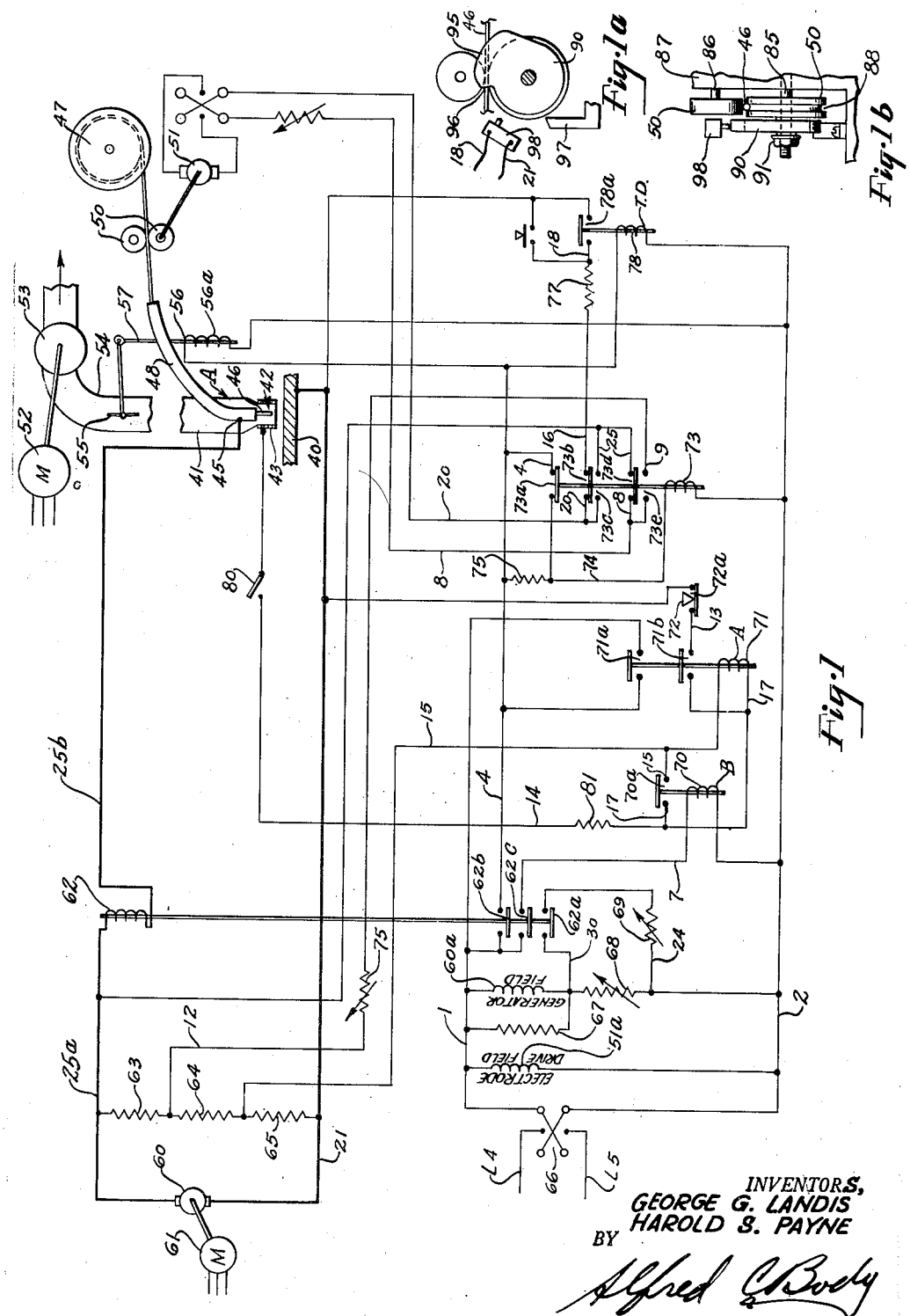
Figure 1 is a combined schematic wiring diagram of control apparatus for and a schematic view of welding apparatus illustrating a preferred embodiment of the invention.

Referring now to the drawings wherein the showings are for the purposes of illustration only and not for the purposes of limiting the invention, Figure 1 shows a welding head A in operative relationship with a workpiece 40 to be welded. Welding heads of the type to which this invention pertains may be said to include means for guiding or feeding flux and an electrode toward the workpiece. The welding head A shown, thus, includes generally an elongated flux hopper 41 having at its lower end a flux-discharge opening 42 defined in the preferred embodiment of the invention by a metallic ring or sleeve 43. An electrode nozzle 45 is positioned generally centrally in the flux hopper 41 and so positioned relative to the flux-discharge opening 42 as to direct a welding electrode 46 being continuously fed from a remotely located reel 47 downwardly through the flux-discharge opening 42 toward the workpiece 40. This electrode 46, as shown, is fed through a flexible conduit 48 as is conventional in the art. Means are provided for continuously advancing the electrode 46 from the reel 47 through the conduit 48 toward the work which, in the embodiment shown, comprises a pair of rolls 50 driven by the armature of an electric motor 51 which will hereinafter be termed the electrode drive motor.

Means are also provided for controlling the flow of flux through the flux-discharge opening or for the causing of such flux flow. While such means may take a number of different forms well known in the art, in accordance with the preferred embodiment of the invention, the means are substantially those shown in copending patent application Serial No. 319,608, filed November 12, 1952, now abandoned and owned by the assignee of this application and are comprised generally of a vacuum pump 53 driven by a motor 52 and connected on the suction side with the upper end of the flux hopper 41 through a long flexible hose 54. The application of the vacuum to the flux-hopper 41 is controlled by any suitable means such as selectively energizing the motor 52 or by means of a valve or the like such as a butterfly valve 55 shown in the drawings. This butterfly valve is controlled by means of a solenoid relay 56 having an energization coil 56a through linkages 57.

The electrode nozzle 45 may be energized by any well-known source of welding potential but, in the embodiment shown, is energized from a direct-current generator 60 driven by a three-phase alternating-current motor 61. The generator 60 energizes the electrode nozzle 45 through bus 25a, the energization coil of a current-control relay 62 and bus 25b, both of which busses have sufficient cross-sectional area of copper to carry the desired welding currents. The other terminal of the generator 60 connects to the workpiece 40 through an equally heavy bus 21 and may also be grounded to the frame of the welding apparatus.

It will be noted that in the preferred embodiment of the invention, no means are provided for breaking the electrical circuit from the welding generator 60 to the electrode nozzle 45 or the workpiece 40 because in the operation of this preferred embodiment, as soon as the welding operation is completed, the electrode 46 will be withdrawn into the electrode nozzle and thereby the danger of contact of the electrode with the workpiece is avoided.

A voltage divider network comprised of relatively low-resistance, high-wattage resistors 63, 64 and 65 all in series are connected between the busses 25a and 21 to provide control voltages for the control apparatus as well as a voltage for energizing and driving the electrode drive motor 51 as will subsequently appear.

As the output voltage of the welding generator 60 varies somewhat under variations in the arc-welding current, the preferred embodiment of the invention provides a second source of direct current for operating additional controls of the apparatus. Thus, in the embodiment shown, such second source of direct current not shown is connected through wire L4 and wire L5 through a polarity-reversing switch 66 to wires 1 and 2. The field 51a of the electrode drive motor 51 is connected directly beteen the busses 1 and 2.

The generator shunt field coil 60a is connected between the busses 1 and 2 through a resistor 68, which determines the open circuit voltage of the generator when no welding is being done. The field coil 60a is also energized through normally open contacts 62a of the current-control relay 62 in series with a resistor 69, the arrangement being such that when the current-control relay is energized as the arc is struck, the contacts 62a will close to increase the generator field current to a value as determined primarily by the resistor 69 and, thus, the generator output voltage to increase the arc-welding current to a final desired value. The setting of the resistor 69 in determining the welding current to a large extent controls the penetration of the weld into the workpiece. A field discharge resistor 67 in parallel with the field coil 60a limits arcing of the contacts 62a when they open.

The current-control relay 62 also includes normally open contacts 62b and 62c. Closing of the contacts 62b when the welding operation takes place energizes the wire 4 from the wire 1 for purposes which will hereinafter be described. Closing of the contacts 62c energizes the energization coil of a relay 70 having normally open contacts 70a from the wire 1 to the wire 7.

Closing of the normally open contacts 70a closes a circuit, shorting or bypassing the energization coil of a pilot relay 71 having normally open contacts 71a and 71b. The contacts 71a when closed form an auxiliary circuit to energize the wire 4. The contacts 71b when closed form a holding circuit for the relay 71, the circuit being traceable from the wire 17, through the contacts 71b, the wire 13, the normally closed contacts 72a of a safety switch 72 to the wire 21. The other wire of the energization coil of this relay 71 connects to the junction point between the resistors 64, 65 through the wire 15.

The control apparatus shown also includes a main relay 73, the purpose of which is to control the direction of rotation of the motor 51. In particular, when this relay is in the unenergized position, the motor 51 is so energized as to drive the electrode feed rolls 50 in a direction to withdraw the electrode 46 from the workpiece. When the relay is energized, its contacts are so arranged as to drive the electrode feed motor 51 in a direction such as to feed the electrode 46 toward the workpiece.

This relay 73 includes normally closed contacts 73a, 73b and 73d and also includes normally open contacts 73c and 73e. The contacts 73a when closed complete a circuit from the wire 4 to the wire 2 through wire 74 such that when the wire 4 is energized, the relay 73 will be simultaneously energized to actuate its contacts. A resistor 75 is connected in parallel with the contact 73a such that when the relay 73 does become energized, it will remain energized through the resistor 75. The purpose of this arrangement is to insure the rapid operation of the relay 73 at the moment that the wire 4 becomes energized, but to subsequently reduce the energizing current to a value sufficient to hold the contacts of the relay in the energized position.

The contacts 73b and 73c energize one terminal of the armature 51 of the electrode drive motor through wire 20 seelctively, either from wire 16 in the unergized position of relay 73, or from wire 25 in the energized position of the relay 73. This wire 25 connects to the bus 25a. In a like manner, the contacts 73d and 73e selectively energize the other terminal of the armature 51 through wire 8; e. g., when the relay 73 is deenergized, the wire 25 and when the relay 73 is energized, through the wire 9 which, as shown, connects to the junction of the resistors 63, 64 through a variable resistance 75 and wire 12.

Thus, in the energized position of the relay 73, it will be seen that the armature 51 is energized by the voltage appearing across the resistor 63. Thus, the speed of rotation of the electrode drive motor 51 will be directly proportional to the voltage appearing across the arc between the electrode 46 and the workpiece 40. If the electrode should approach the workpiece 40 too closely, the arc voltage will go down and the electrode drive motor 51 will, accordingly, be slowed down. On the other hand, if the electrode 46 should burn off more rapidly, the arc length will increase and the voltage across the arc will increase, thus increasing the voltage across the resistor 63 and increasing the speed of the motor 51 to advance the electrode 46 toward the workpiece 40 at a faster rate and, thus, tend to close or shorten the length of the electric arc. Automatic compensation for the arc voltage is, thus, obtained.

When the relay 73 is in the de-energized position, as pointed out above, the electrode motor 51 will be energized to move the electrode in the opposite direction; that is to say, away from the workpiece 40. This circuit may be traced through the normally closed contacts 73d to the wire 25 and through the normally closed contacts 73b, wire 16, a resistor 77, wire 18 and the normally open contacts 78a of a time-delay relay 78 and to the bus 21. Thus, when the time-delay relay 78 is energized, the motor 51 will be energized to withdraw the electrode 46 from the workpiece 40. This relay 78 is so arranged as to be energized only during the duration of the welding operation and to become de-energized the moment that the welding operation ceases. However, its contacts 78a do not open for a predetermined period of time after the relay 78 becomes de-energized, which relay, as will be noted, is energized from the same bus 4 as is the relay 73 so that when the relay 73 becomes de-energized, the motor 51 will be caused to operate to withdraw the electrode 46 from the workpiece 40 for this predetermined period of time.

Means are provided on the welding head A which, when engaged with the workpiece 40, such as by positioning the welding head A for welding, will start into operation the sequence of events necessary to start the welding. Such means may include a pressure-sensitive switch or, as is shown in the preferred embodiment, an exposed electrically conductive member, such as the sleeve 43. This sleeve is electrically energized relative to the workpiece 40 through the pilot relay 71 such that contact of the sleeve with the workpiece will complete a circuit through the relay 71 which will result in a chain of events to be described to start the welding operation.

Means are also provided to prevent accidental contact of the sleeve 43 with the workpiece 40 from starting the welding operation. Thus, a push-button switch 80 having normally open contacts is connected in series with the energization wire for the sleeve 43, which switch 80 must be closed simultaneously with the engagement of the sleeve 43 with the workpiece 40 to effect the start of the welding operation.

At the start of a welding operation, the end of the electrode 46 is withdrawn into the welding head A such that when the sleeve 43 is contacted with the workpiece 40, there will be no danger of the end of the electrode 46 engaging the workpiece. Preferably, the end of the electrode is withdrawn into the welding head a substantial distance beyond the lower end of the sleeve 43 and into the lower end of the electrode nozzle 45.

In operation, the generator drive motor M drives the generator 60, continuously energizing the busses 21 and 25a. It will be noted that the electrode 46 is continuously energized relative to the workpiece 40. Additionally, the motor 52 drives the vacuum pump 51. Valve 55 is normally open and a continuous flow of air enters the flux-discharge nozzle 42. Any flux (not shown) in the flux hopper 41 will remain generally in a continuous state of agitation or, if it should attempt to fall outwardly through the flux-discharge opening 42, it will immediately be picked up and carried back into the hopper 41. Likewise, the flux hopper can be filled by placing the nozzle in a supply of flux. Wires 1 and 2 are continuously energized through a polarity-reversing switch 66 from the wires L4 and L5 and, preferably, a source of constant direct voltage. The field 51a of the electrode drive motor and the field 60a of the generator are continuously energized, the latter through the resistor 68. The electrode 46 is, thus, continuously energized with an open circuit voltage determined by this resistor 68.

When it is desired to start a weld, the welding head A is positioned adjacent the work and the flux-discharge nozzle 43 is simply touched to the work while, at the same time, depressing the push-button switch 80 to complete a circuit from the bus 21 through the workpiece 40, the sleeve 43, the now closed contacts of the switch 80, wire 14, resistor 81, wire 17, the energization coil of the pilot relay 71 and the wire 15 to the junction point of the resistors 64, 65. The relay 71 is thus energized by the potential across the resistor 65, thus causing its normally open contacts 71a and 71b to close. Closing of the contacts 71a completes a circuit from the wire 1 to the wire 4, thus energizing the main relay 73 and the time-delay relay 78 and opening and closing the respective contacts thereof. Opening of the contacts 73a breaks a circuit from the wire 4 to the wire 74 but leaves the resistor 75 in series with the energization coil of the relay 73 and, thus, this relay will stay energized. Closing of the contacts 73c and 73e completes the energizing circuit for the armature of the electrode drive motor 51 from the bus 25a through the variable resistor 75 to the junction point of the resistors 63, 64, thus energizing the motor 51 to drive the electrode 46 toward the workpiece. It will be noted, however, that at the time the motor 51 is energized, the electrode 46 is at a substantial distance from the workpiece 40 so that there is a time delay occurring before the electrode 46 actually contacts the workpiece to strike an arc therebetween and commence the welding.

At the same time that the relay 73 and 78 is energized, the energization coil of the relay 56 is energized to close the butterfly valve 55, thus cutting off the pump 51 from the flux hopper 41. The flux in the hopper thus has nothing to prevent its falling through the flux-discharge opening and it immediately does so to deposit a pile of welding flux on the workpiece 40. At some predetermined time after this flux has been deposited on the workpiece 40, the electrode 46 engages the workpiece 40 to strike the arc and start the actual arc welding. It will be appreciated that this time interval will depend upon the distance that the electrode 46 was from the workpiece 40 when the motor 51 was initially energized, as well as the voltage applied to the armature 51. This voltage is somewhat reduced from that of the normal welding operation because of the resistor 68 in series with the generator field 60a. This time delay may be readily adjusted within any desired limits but, generally, should be on the order of one-half to three seconds.

The closing of the contacts 71b of the main pilot relay 71 completes a holding circuit for this relay from the bus 21, through the normally closed contacts 72a of a safety switch 72, the wire 13, the now closed contacts 71b, the wires 17, the coil of the relay 71 and the wire 15 to the junction point of the resistors 64, 65. Thus, either the switch 80 may be released or the electrical contact of the sleeve 43 with the workpiece 40 may be immediately broken once it has touched the workpiece 40 so as to be able to control the flow of flux out of the flux hopper 41 which, as pointed out above, commences when the relay 71 is energized.

Immediately when the electrode 46 strikes the workpiece 40, arc-welding current flows through the current-control relay 62, thus causing its normally open contacts to close. Closing of the contacts 62a complete a circuit from the wire 24 to the wire 30 around the resistor 68, thus increasing the energization of the generator field 60a to an amount determined by the resistor 69 and, thus, increasing the voltage output of the generator 60 to raise the welding current to its full and final welding value. Closing of the contacts 62b completes a circuit from the wire 1 to the wire 4, which wire 4 will now remain energized during the entire duration of the welding cycle.

Closing of the contacts 62c energizes the relay 70 thus closing its normally open contact 70a which, as previously pointed out, de-energizes the pilot relay 71. De-energization of this relay breaks its holding circuit through the contacts 71b and opens the contacts 71a. However, as the contacts 62b now closed are in parallel with the contacts 71a, the opening of the contacts 71a has no effect.

The welding operation may now continue in a normal manner with the drive rolls 50 continuously feeding an electrode toward the workpiece 40 as the electrode 46 is continuously burned off, thus depositing a continuous bead of metal on the workpiece 40.

It is preferred that the generator 60 have a current rating and voltage output rating such that the current density in the wire 46 will always be sufficient to cause substantially instantaneous fusion should the electrode 46 ever touch or bump the workpiece 40. However, it is preferred that the electrode 46 not actually contact the workpiece 40 and, for this reason, the armature of the motor 51 is connected in parallel with the output of the generator 60 so that its driving speed will always be proportional to the arc voltage. As the electrode approaches the workpiece, the arc voltage will drop and the electrode drive speed will drop and vice versa.

Whenever the operator desires to stop a welding operation, there is no need for him to operate any switches or otherwise. All the operator must do is to simply withdraw the welding head A away from the workpiece rapidly or at a rate at least greater than the speed of feed of the electrode 46. The arc length immediately becomes too great for the voltage of the generator 60 to sustain the arc and the arc goes out, thus stopping the welding current. Stopping of the welding current de-energize the current-control relay 62, thus opening its now closed contacts. Opening of the contacts 62a places the resistor 68 back in series with the generator field 60a, thus reducing the output voltage of this generator. Opening of the contacts 62c de-energizes the relay 70, thus opening its normally open contacts 70a which has no effect. Opening of the contacts 62b, however, de-energizes the wire 4, thus de-energizing the flux-control relay 56, the main relay 73 and the time-delay relay 78.

De-energization of the relay 56 opens the butterfly valve 55, thus once again communicating the pump 51 with the flux hopper 41 so that a flow of air immediately commences to flow inwardly through the flux-discharge nozzle 42, thus stopping the further flow of flux onto the workpiece 40. De-energization of the relay 73 reverses the polarity of the voltage being fed to the armature 51 and energizes this motor 51 through the contacts 73b and the contacts 78a of the time-delay relay 78 which, as previously indicated, is now de-energized. However, its contacts 78a remain closed for a predetermined period of time to cause the motor 51 to run in a reversed direction to pull the electrode nozzle 46 back into the welding head A at least below the lower end of the ring 43. After a predetermined period of time, the time-delay relay 78 opens its normally open contacts 78a to de-energize the electrode drive motor 51. The amount of time delay is adjusted in relation to the speed of the motor 51 in the reverse direction to pull the electrode 46 back the desired distance. This distance may vary, all within the scope of the invention. For example, it is preferred that the end of the electrode 46 be at least pulled in beyond the lower edge of the ring or sleeve 43 so that when it is desired to start another welding operation, the ring 43 may be touched to the worpiece without any danger of the electrode 46 first touching the worpiece and striking an arc before the flux from the flux hopper has had a chance to be deposited onto the workpiece.

It will be appreciated, however, that the end of the electrode 46 during the welding operation has been submerged in a pool of molten flux and it has been found that in some instances a bead of flux will cling to the end of the electrode 46 as it is pulled away from the workpiece 40 to extinguish the arc. This bead 40 can seriously interfere with the successful striking of the arc on the next welding operation unless the operator takes special precautions to move the eelctrode relative to the workpiece as the electrode initially strikes the workpiece. Therefore, the present invention contemplates withdrawing the electrode 46 a sufficient distance such that its end will be completely within the passage of the electrode nozzle 46. As this passage has a diameter just large enough to pass the electrode 46, the end of the nozzle 45 has a tendency to wipe off this bead of flux material so that the electrode will, when next advanced toward the work, immediately make electrical contact therewith so that the arc will be struck.

The amount of pull back of the electrode 46 will also depend upon the time delay required between the closing of the butterfly valve 55 to start the depositing of the flux on the workpiece 40 and the engagement of the electrode 46 with the workpiece 40, it being appreciated that the further that the electrode 46 has been pulled back, the longer the time delay required to again advance the electrode out of the nozzle 45 through the sleeve 43 to the workpiece 40.

While time-delay means in conjunction with the speed of pull back of the electrode 46 have been provided for the purposes of controlling the length of the pull back, it will be obvious that other means could be employed; such as, mechanical means engaging the electrode or the rolls 50 to stop the motor 51 after the electrode has been pulled back a predetermined distance, an embodiment of which will be described hereinafter.

The switch 80 is preferably mounted directly on the welding head A and its closing enables the operator to selectively determine when the engagement of the sleeve 43 will start the welding operation in its cycle of operation. Obviously, this switch may, if desired, be eliminated so that whenever the sleeve 43 contacts the workpiece 40 when the welding apparatus is not welding, the welding cycle will be commenced. Obviously, once the welding cycle is commenced, the relay 70 is energized, thus locking the relay 71 out of the circuit so that subsequent touching of the sleeve 43 to the workpiece 40 would have no effect on the operation of the apparatus.

The safety switch 72 is provided so that if the feeding of the electrode in the flux has been started for any reason and the operator desires to stop the cycle before the arc is struck, he may depress the switch 72, thus breaking the holding circuit for the relay 71 and stopping the operation of the apparatus. Such stopping will, however, cause the time-delay relay 78 to operate in the manner discussed above so that the electrode 46 will be pulled back into the electrode nozzle as above described. Obviously, jogging means for the electrode either in or out may be provided if desired. Such jogging means are known in the art and are, therefore, not shown in the drawings.

The welding head A shown is preferably of the portable type, the connections to the pump 51 being through a long flexible hose and the tube or conduit 48 being of a flexible construction. The electrode wire 46 is preferably of a small diameter of from a sixteenth of an inch to five thirty seconds of an inch so that it also is flexible, thereby enabling the welding head to be freely moved about by the welding operation. Also, while only one electrode wire 46 is shown in the drawings, obviously a plurality of such wires could be employed with equal success.

The welding head A has been shown of the type wherein the flow of flux outwardly through the flux-discharge opening is controlled by means of a controllable vacuum in the hopper which selectively will cause a flow of air inwardly through the flux-discharge opening or allow it to flow outwardly onto the workpiece. It will be appreciated that other forms and other means for controlling the flux outwardly to the flux-discharge opening may be employed.

It will also be appreciated that some means can be provided for spacing the welding head from the workpiece 40, as well as for propelling the welding head along the workpiece 40. The propelling means, if employed, may be energized either at the moment the electrode engaged the workpiece or simultaneously with the energization of the relay 56 and the relay 73 such that by the time the welding electrode 46 has reached the workpiece, the welding head will be traveling along the workpiece at a predetermined speed, the effect of which will be to rub the end of the electrode 46 as it initially strikes the workpiece 40. This rubbing will insure good electrical contact with the workpiece 40 and assist in the rapid striking of the electric welding arc.

This modification has been described with reference to apparatus wherein the generator output voltage is reduced before the welding electrode strikes the work. This limits the initial surge of current and, in some instances, results in improved starting.

The invention has also been described by showing the use of a D. C. arc-welding voltage and a D. C. energizing potential for the various control relays. Obviously, if desired, A. C. power could be employed.

Basically, the invention resides in welding apparatus and the controls therefor whereby the operator need merely touch the welding head to the work to start a sequence of operations to permit him to effect a weld and to pull the welding head away from the work to stop the welding operation and prepare the apparatus for the start of the next weld.

Figure 2:
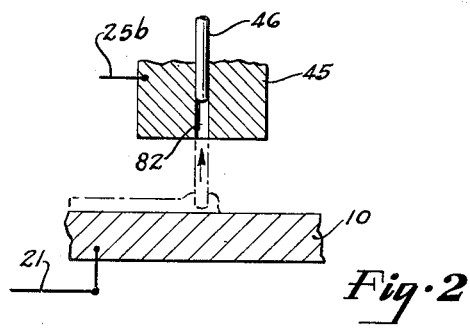
Figure 2 is a cross-sectional view of an electrode nozzle and electrode illustrating the pull back of the preferred embodiment.

As stated, one of the objects of the invention was to wipe the bead of flux which might form on the end of the electrode off of such end so that the end of the electrode could easily and readily make contact with the workpiece the next time it was desired to start a welding operation. This is done in accordance with the preferred embodiment of the invention by withdrawing the electrode 46 into the electrode nozzle 45. Thus, the lower end of the nozzle 45 immediately surrounding the electrode passage 82 in the nozzle, which passage 82 has a diameter substantially equal to the diameter of the electrode 46, would wipe off any flux which might be on the electrode tip. Obviously, if desired, in accordance with the invention, the welding operation could be stopped by maintaining the position of the welding head A in relation to the work 40 and providing a manually operable switch in series with the energization coil of the relay 73, which switch, when actuated, would de-energize the relay 73, thus effecting a reversal of the motor 51 and causing the electrode 46 to be retracted into the electrode nozzle 45. Normally, the end of the electrode nozzle 45 is spaced such a distance from the workpiece 40 that as the electrode 46 is withdrawn under the influence of the motor 51, the length of the arc will become so great that the voltage from the generator 60 cannot sustain it and the arc will go out. Immediately thereafter, the end of the electrode 46 will be drawn into the passage 82 and the bead of flux which might have formed on there will have been wiped off. After the end of the electrode 46 has entered the passage 82, the time-delay relay 78 or such other means as are provided for controlling the length of the pull back of the electrode will actuate to stop the motor 51, thus leaving the welding apparatus in condition to start the next welding cycle. Figure 2 shows the electrode 46 in the pulled back position in the electrode nozzle 45.

In some instances, it has been found that the effect of pulling the electrode 46 back into the electrode nozzle 45 is simply to carry the arc from the electrode 46 to the end of the nozzle, which arc then continues and will melt the end of the nozzle, thus destroying it.

The present invention also contemplates means for positively snuffing out the electric arc as the electrode 46 is pulled back. Thus, is Figure 3, there is shown a cap 84 positioned over the end of the nozzle 45 having a passage 85 therethrough aligned with the passage 82 on the nozzle. This passage 85 is proportioned so as to fit closely around the outer surface of the electrode 46 and suffices to provide a narrow restricted path through which the arc would have to travel in order to get to the end of the nozzle 45. Such cap, however, has been found to very effectively extinguish the electric arc. The cap 84 should preferably be formed of a high-temperature resistant electrical material such as a glass fiber reinforced polyester resin molded to the desired shape and cured at an elevated temperature. In the embodiment shown in Figure 3, the cap fits over the entire end of the nozzle 45 and may be mounted thereon in any suitable way such as by set screws, an interference fit or otherwise.

Figure 3:
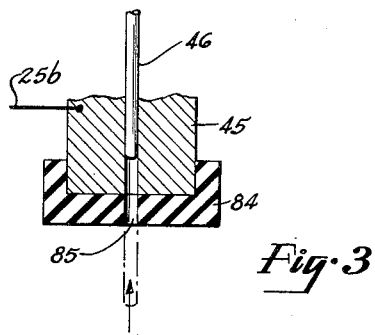
Figures 3 and 4 are similar views to Figure 2 showing modified forms of electrode nozzles.
Figure 4:
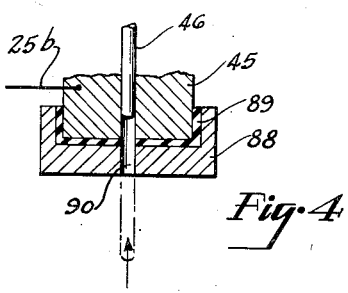

In the embodiment of the invention shown in Figure 4, a cap 88 similar in shape to the cap 84 of Figure 3 is provided, which cap 88 is preferably made of a heat-conducting material such as copper and is mounted over the end of the electrode nozzle 45 with a thin layer of insulation therebetween. This cap 88 and the insulation 89 have passages therein of a size to just pass the electrode 46 aligned with the passage 82 of the nozzle 45.

With the insulating cap of Figure 3, it has been found that after a period of use, the passage 85 through the cap will become enlarged and slightly burned from the heat of the arc being snuffed out in the passage. However, with the metal cap 88 of Figure 4 insulated from the end of the electrode nozzle 45, it has been found that no problem of burning of the metal is encountered.

In each case, as the electrode 46 is pulled back into the respective passage, the flux bead is wiped off of the end of the wire so that the electric arc may be quickly established at the very instant that the end of the electrode again touches the workpiece 10.

It will be noted that the electrode nozzle 45 is electrically insulated from the sleeve 43 and the flux hopper 41 is preferably of electrically insulating material or, if not of electrical insulating material, then insulated from the electrode nozzle 45 so that when the electrode 46 is withdrawn beyond the lower edge of the sleeve 43, the electrode and electrode nozzle will aways be insulated from accidental contact with the workpiece 40 or any other metallic member at the same electrical potential as the workpiece 40. Because of this, it will be appreciated that the electrode may, at all times, be electrically energized from the power source 60 without the danger of accidental or unintentional arcs being struck. The need for heavy current-carrying contactors in series with the electrode energizing leads 25b are thus dispensed with.

As previously stated, mechanical means may be employed for the purpose of determining the distance which the electrode will be pulled back into the welding head. One embodiment of apparatus capable of performing this function is shown in Figures 1a and 1b. Thus, in Figure 1b, the drive rolls 50 are shown mounted for rotation on spaced parallel shafts 85, 86, in turn mounted for rotation in a suitable frame or base 87. One of the rolls 50 is shown, as is conventional, with a groove 88 in its outer surface, the other roll 50 having a flat surface and so positioned as to pinch the electrode 46 into the groove 88. Preferably, the groove roll 50 is the driven roll. The shaft 85 extends beyond the roll 50 and a cam member 90 is mounted for rotation on the shaft 85 just to the left of the roll 50. The outboard end of the shaft 85 is threaded and a nut or other adjustable means 91 is positioned thereon to retain the cam 90 in assembled position. A spring member is positioned between the nut 91 and the side of the cam 90 so as to press the cam 90 lightly into frictional engagement with the side of the drive roll 50. Thus, as the drive rolls 50 rotate, the cam 90 will tend to rotate therewith, at least until some exterior force is applied to stop the rotation of the cam 90. In effect, there is an overdriven clutch arrangement.

The cam 90 has a lobe 95 projecting outwardly therefrom and having a circumferential extent of approximately 90 degrees of the entire periphery of the cam 90. This lobe preferably extends on its counterclockwise side outwardly generally on a radial nile which provides a surface 96 engageable with a stop 97 mounted on the frame 87. A switch 98 is also mounted on the frame 87 and adapted to be actuated by the lobe 95 when the cam rotates in a counterclockwise direction. After the switch 98 has been actuated, the surface 96 engages the stop 97, thus stopping further rotation of the cam 90, continuing to hold the switch 98 actuated and, at the same time, permitting the electrode drive rolls 50 to continue to operate. The switch 98 is connected between the wires 18 and 21; that is to say, in place of the contacts 78a of the time-delay relay 78 which, when the embodiment shown in Figures 1a and 1b is employed, may be entirely eliminated.

The operation of the apparatus, when the electrode 46 is being fed toward the workpiece; that is, during a welding operation, is essentially identical to that described above. However, as soon as the arc is broken by withdrawing the welding head from the workpiece 40, the current relay 62 actuates and the same sequence of events occurs as above described; that is to say, the electrode drive motor 51 is reversed. Instead of being energized to the contact 78a, it is, instead, energized through the closed contacts of the switch 98. The drive roll 50 is thus caused to rotate in a clockwise direction and the cam 90 turns with the roll 50. As soon as the lobe 95 has rotated a sufficient distance, the switch 98 is no longer actuated by the cam 95 and opens to thus stop the rotation of the electrode drive motor 51. The apparatus is now ready to be restarted generally as above described. When the sleeve 43 is touched to the workpiece 40 and the switch 80 closed, the same sequence of events takes place. Counterclockwise rotation of the roll 50 causes the cam 95 to move so as to close the switch 98 until the surface 96 engages the stop 97. The switch 98 remains closed until the welding operation is stopped as above described.

Obviously, other mechanical means could be employed for controlling the length of pull back of the electrode 50, which means could include switch means engaging the wire and sensitive to the movement thereof.

The mechanism shown in Figures 1a and 1b is, in some respects, preferable to the use of a time-delay relay because a means is provided for positively limiting the length of pull back of the electrode. It is sometimes difficult to obtain accurate time-delay relays; in which event, the electrode will be pulled back different distances, depending upon the actual time required for its contacts to open or depending upon the speed of rotation of the electrode drive motor 51 when it is retracting the electrode.

Obviously, by changing the position of the stop 97 or the shape of the cam 90, different lengths of pull back may be readily obtained.

Figure 5 shows a stil further modified embodiment of the invention which, insofar as the automatic starting of the welding operation and the automatic ending of the operation, including the pull back of the electrode, operates essentially as the embodiment of Figure 1, the prime differences being a slightly simpler arrangement of the relays and two major differences; namely, the method of controlling its energization at the time of initiating the welding arc and a tractor unit 150 powered through a flexible drive cable 151 by a remotely located tractor drive motor 152. This motor may be mounted on the same dolly with the electrode reel and pump 53. This motor includes a field 154 continuously energized across the wires 1 and 2 and an armature 155 energized from the same wires through a second set of normally open contacts 98c on the limit switch 98. One possible form of tractor unit and method of drive is described more fully in the copending application of Harold S.

Payne, Serial No. 357,051, filed May 25, 1953, now abandoned, and assigned to the assignee of this application. Obviously, other forms of tractor units may be employed.

In this embodiment of the invention, a voltage-divider network comprised of resistors 120, 121, 122 and 123 is connected in series between the busses 25a and 21 and form terminals 112, 103 and 105 respectively, which terminals have control voltages thereon proportional to the resistances and the output voltage of the generator 60' for the purposes which will hereinafter be described.

The generator field 60a is, as described in the preferred embodiment, connected in parallel with a field-discharge resistor 67, this parallel circuit, in turn, being connected in series with a field voltage control resistor 125 and this series circuit is connected between the control voltage busses 1 and 2. The resistor 125 may be made variable so that the energization of the generator field 60a may be readily controlled. A field-control relay 126 has normally open contacts 126a connected in parallel with the resistor 125 such that when the relay 126 is energized, the resistor 125 will be shorted out of the circuit and the generator field will receive the full potential between the busses 1 and 2. This field relay 126 receives its energization through the normally closed contacts 128a of a running control relay 120a and, as will appear, before the welding operation is commenced, is in the energized condition so that the generator field is receiving a full excitation voltage.

The apparatus also includes a starting relay 130 having a pair of normally open contacts 130a and 130b. This relay 130 receives its energization when the start switch 80 is closed, the circuit being traceable from the bus 21 through the start switch, wire 117, the relay 130, the normally closed contacts of an emergency stop switch 132 and the wire 103 which leads to the corresponding terminal of the voltage divider. Momentary energization of this relay 130 closes its normally open contacts. Closing of the contact 130b completes a circuit from the wire 117 to wire 107 and thence through the normally closed contacts 128b to the power bus 21 which, thus, provides a holding circuit for the relay 130 and it remains energized until either the emergency stop switch 132 is depressed or the relay 128 becomes energized. The closing of contact 130a energizes wire 113 from the bus 2, which wire 113 starts into operation the series of events to start the welding operation. Thus, energization of the wire 113 energizes the flux relay 56 through the normally closed contact 134a of a push-button control switch 134, the function of which will be herein later described, and wire 109. Energization of this solenoid 56 causes the flux to flow upon the workpiece 40 as herein previously described.

Energization of the wire 113 also energizes the energization coil of a relay 135 having normally open contacts 135a and 135b and a normally closed contact 135c. Closing of the contacts 135a and 135b complete a circuit from the power bus 25b, wire 108 which connects directly to one terminal of the armature of the electrode drive motor 51, the other terminal of which connects to the terminal point 112 on the voltage-divider circuit.

The electrode drive motor is thus energized with the voltage appearing between the bus 21 and the terminal 112 and commences to rotate to drive the electrode 46 toward the workpiece at a speed which preferably approximates that of the final drive speed, this speed being obtained by so adjusting the resistances of the various resistors in the voltage-divider circuit. As the electrode drive motor commences to turn, the cam 90 is rotated to close the normally open contacts 98a and 98b of the limit switch 98. Generally, as these contacts close, the end of the electrode has almost reached the workpiece. Closing of the contacts 98b energizes the tractor motor 150 and starts the welding head A moving along the workpiece. Immediately thereafter, the electrode strikes the workpiece. A scratching action of the electrode end on the workpiece results which facilitates the starting of the arc.

One terminal of contact 98a is connected through wire 118 to the contacts 135c and the other terminal is connected through wire 110, a resistor 138, to the bus 21. However, as the contacts 135c are now open, the closing of these contacts 98a has no effect. The contacts 98a and 98b remain closed so long as the electrode drive motor 51 is advancing electrode wire 46 toward the workpiece. The end of the electrode 46 first advances through the pile of flux deposited on the workpiece during the time interval for the end of the electrode to advance from its normally retracted position to the workpiece and subsequently electrically engages the workpiece 40. A very high instantaneous current flows from the electrodes 46 to the workpiece 40 to start the arc. It is to be noted that at this moment there is no interruption in the movement of the electrode 46 toward the workpiece. It is being fed essentially at its ultimate welding speed.

Immediately upon the arc being struck, the curent relay 140 becomes energized, thus closing its normally open contacts 140a and 140b. Closing of the normally open contact 140a enegizes the wire 115 from the wire bus 2, thus energizing the running relay 128. Energization of this relay opens its normally closed contacts 128a and 128b and closes its normally open contacts 128c and 128d. Opening of the contacts 128a denergizes the field relay 126, thus opening its contacts 126a and placing the resistor 125 in series with the generator field. This immediately reduces the output voltage of the generator 60 to the desired final operating value.

Opening of the contacts 128b breaks the holding circuit for the start relay 130 and this relays may now open but without effect on the operation of the apparatus. Closing of the contacts 128c energizes the wire 113 which was previously energized by the closing of the contact 130a of the start relay. Closing of the contacts 128d completes the circuit from the wire 21 to the terminal 103, thus shorting out the resistors 123 and 122. In a like manner, the closing of the contacts 140b of the current relay 148 places a resistor 142 in parallel with the resistors 121, 122 and 123. The over-all effect of shorting out these resistors is to compensate for the changes in voltage applied to the electrode drive motor 51 which would normally take place due to the current in the arc circuit and the reduction of the generator field voltage by the opening of the contacts 126a. The electrode drive motor 51 thus continues to drive the electrode 46 toward the workpiece preferably at a speed equal to the melt-off rate of the electrode. Should the electrode burn off more rapidly than the electrode is being fed, it will be appreciated that the arc length and the arc voltage will increase, which will thus increase the voltage applied to the motor 51 to increase its speed of rotation and the speed of feed of the electrode 46. Automatic compensation of the electrode feed speed thus results.

The welding operation proceeds without interruption, the welding head being moved along the workpiece at a steady predetermined speed by means of the tractor unit 150 mounted on the welding head.

Whenever it is desired to stop the welding, the operator need simply pull the welding head away from the workpiece, in which event the arc is broken and the current delay 41, being de-energized, opens its now closed contacts. Opening of the contact 140a de-energizes the running relay 120a, thus returning its contacts to their normal position.

Closing of the contacts 128a re-energizes the field relay 126 which again places full field voltage on the generator field 60a but, as the arc is now out, nothing happens except to prepare the welding apparatus for the start of the next welding operation. Opening of the contacts 128c, however, de-energizes the wire 113 and, thus, the flux control relay 56 which then operates to stop the flow of flux from the welding head.

The principal thing that happens by the de-energization of the wire 113, however, is the de-energization of the electrode feed relay 135. This closes its contacts 135c, the effect of which is to reverse the polarity on the electrode feed motor 51, the circuit being traceable from the terminal 112, electrode feed motor armature 51, wire 108, the now closed contacts 135c, wire 118, the now closed contacts 98a of the switch 98, wire 110, resistor 138 to the bus 21. This immediately reverses the electrode drive motor 51 and causes the electrode wire 46 to be retracted into the electrode nozzle 45. Reversal of the electrode drive rolls 50 also reverses and drives the cam 90 in a counterclockwise direction to open the contacts 98a and 98b after the electrode 46 has been withdrawn a predetermined distance. When the switch 98 opens, the motor 51 is then de-energized and stops, the electrode wire 46 being entirely retracted into the welding head A. There is, thus, no danger of accidental electrical contact between the electrode 46 and the workpiece from starting a welding operation.

If at any time it is desired to manually cause the electrode wire to be further retracted into the welding head, a manually controlled, normally open contact switch 145 is provided which is in parallel with the contacts of the switch 98.

If at any time it is desired to cause the electrode to feed out of the welding head, the switch 134 may be depressed, thus closing its normally open contacts 134b and energizing the wire 113 from the wire 2. Energization of the wire 113 energizes the electrode feed relay only to energize the electrode feed motor 51 to drive the electrode out of the welding head A. Upon release of the switch 134, however, the motor will be reversed as above described and the electrode caused to retract a predetermined distance which, in this instance, may not be entirely within the welding head A, depending upon how far the electrode was caused to advance out of the welding head in the first instant.

The starting circuit shown in the above-described alternative embodiment has proven particularly effective where the ultimate welding is to be carried out at current densities in the electrode tip below approximately 60,000 amperes per square inch. In this embodiment, the generator is energized to produce an initial current density in excess of this value so that the electrode end will immediately fuze and start the arc. Care must be employed that the current density is not too high, however, to avoid blasting off of the entire electrode end or stickout portion. The starting arrangement of the first-described embodiment is particularly of value where the ultimate current density will be well above 60,000 amperes per square inch; in which event, it is normally desirable to reduce the initial starting current density to prevent the blasting above referred to. The particular adjustments of the generator and current densities employed, however, form no part of the present invention.

The welding head A in this embodiment of the invention has been shown as provided with a remotely powered tractor unit 150 in engagement with the work which advances the welding head at a predetermined and constant speed along the work. In the submerged-arc type of welding, the weld seam is completely covered by a layer of granular flux and it is normally impossible for the welding operator to visually observe the weld to determine whether the welding head is being moved at the proper speed. In this embodiment of the invention, the tractor unit is powered through a flexible cable 151 by a motor 152 which is energized when contacts 98b on switch 98 close, which, in turn, is controlled by rotation of the cam 90.

As above described, movement of the cam 90 when the electrode wire is being retracted controls the distance of retraction of the electrode wire. The cam, in this embodiment, also serves the additional function of timing the starting of the tractor motor 152 as the electrode initially moves prior to the striking of the arc toward the work. The adjustment of the cam and switch is so made that the tractor motor will be energized just before the electrode end contacts the work. Thus the electrode end is moving horizontally along the workpiece at the moment of initial contact and a scratching action of the electrode end of the workpiece results to facilitate making electrical contact with the workpiece and the starting of the arc. This scratching helps to break any bead of fused flux which might be on the electrode end from previous welding operations. Also, this horizontal movement prevents the electrode wire from becoming jammed on top of a piece of granular flux.

A pair of cams and limit switches could be employed, one to control the pull back of the electrode and the other to control the starting of the motor 152.

If timing means are employed to control the distance that the electrode is retracted into the electrode nozzle, then it will be appreciated that additional timing means could be employed to control the instant of starting of the tractor drive motor 152, which last-mentioned timing means could be adjusted to some time interval, usually just under the time interval of retraction, or to insure that the motor 152 will become energized immediately just prior to the engagement of the workpiece 40 by the electrode.

It will be appreciated that the tractor motor 152 could be so arranged as to be energized upon the closing of the current relay 140, but, in this instant, the electrode would strike the workpiece without the benefit of any horizontal movement and the scratching action above referred to would not result. In such a case, the welding operator must wiggle the welding head A at this moment of contact to provide the scratching action and insure proper electrical contact of the electrode with the workpiece.

Alternatively, the tractor drive motor 152 could be energized simultaneously with the electrode drive motor 51. However, during the time interval for the retracted electrode end to reach the work, the welding head A will have moved an appreciable distance along the workpiece. The welding operator would have difficulty in starting the weld at the exact spot in the workpiece desired, although, with such an arrangement, the scratching action above referred to will result.

The arrangement shown for starting the tractor is thus preferred.

The tractor 150 is shown as actually engaging the workpiece which is preferred when the invention is applied to a portable welding head such as has been described hereinabove. However, the tractor drive unit could also engage any other fixed member or could take essentially different forms from that shown in the event the invention were to be applied to fully automatic welders. The specific control of the tractor described is particularly applicable where high lineal welding speeds are employed and any appreciable time delays between actuation of the tractor and engagement of the workpiece with the electrode would result in appreciable movements of the welding head from the original position where located by the welding operator to the point where the arc is actually struck.

Obviously, other means could be employed for initiating the movement of the welding head along the workpiece just prior to the engagement of the electrode end with the workpiece, including means engaged by the electrode end as it leaves the electrode nozzle or other means independent of the electrode drive rolls responsive to the advancing and retracting movements of the electrode wire.

For the purposes of describing and illustrating the invention, only a preferred embodiment has been shown and described in detail. Obviously, modifications and alterations differing radically in appearance and arrangement will occur to others upon a reading and understanding of this specification and it is our intention to include all such modifications and alterations insofar as they are included within the scope of the appended claims.

Having thus described our invention, we claim:

1. In electric arc welding apparatus comprising an electrode nozzle electrically energized relative to a workpiece through which an electrode is adapted to be continuously advanced toward the workpiece, means for driving an electrode through said nozzle toward said workpiece and other means operative whenever the arc-welding current is broken to reverse said electrode drive means, to move the electrode back through said nozzle a predetermined distance.

2. Electric arc-welding apparatus comprising, in combination, means for feeding an electrode toward and away from a workpiece to be welded including a rotatably mounted electrode drive roll, cam means and an overdriving clutch connecting said drive roll with said cam means and a switch adapted to be actuated by said cam means when said electrode roll moves in a direction to advance an electrode toward the workpiece, such cam means opening said switch after a predetermined amount of rotation of said electrode drive roll in a direction to retract the electrode.

3. Arc-welding apparatus comprising, in combination, an electrode nozzle, means for energizing said nozzle relative to a workpiece and means for moving an electrode relative to said nozzle and towards a workpiece during a welding operation and control means for said electrode moving means including means for reversing same for a predetermined period of time upon interruption of the welding current.

4. Arc-welding apparatus comprising, in combination, an electrode nozzle, means for energizing said nozzle relative to a workpiece and means for moving an electrode relative to said nozzle and towards a workpiece during a welding operation and control means for said electrode moving means including means for reversing same upon interruption of the welding current and, means for stopping said reversed electrode drive means after the electrode has been withdrawn a predetermined distance.

5. Arc-welding apparatus comprising, in combination, means for feeding an electrode toward a workpiece, means for feeding flux toward a workpiece, circuit means including a bare contact member operative upon engagement with the workpiece to actuate the flux feed means to feed flux toward the workpiece and at a predetermined period of time thereafter to cause the electrode to engage the workpiece, and means for reversing the electrode drive means for a predetermined distance of movement of the electrode whenever the arc is broken.

References Cited in the file of this patent
UNITED STATES PATENTS

| | | |
|---|---|---|
| 2,060,772 | Moffett | Nov. 10, 1936 |
| 2,175,017 | Cockrell | Oct. 3, 1939 |
| 2,210,786 | Wasmund | Aug. 6, 1940 |
| 2,460,990 | Kratz | Feb. 8, 1949 |
| 2,510,204 | Baird | June 6, 1950 |
| 2,510,205 | Baird | June 6, 1950 |
| 2,550,495 | Pilia | Apr. 24, 1951 |
| 2,634,355 | Girard | Apr. 7, 1953 |